(12) United States Patent
Hill et al.

(10) Patent No.: US 7,882,824 B2
(45) Date of Patent: Feb. 8, 2011

(54) METHOD FOR RECOVERING VAPOR DURING AN ONBOARD REFUELING OPERATION

(75) Inventors: David T. Hill, Commerce Township, MI (US); Scott P. Garabedian, Warren, MI (US); Robert Roland Cummer, Midland, MI (US); Saurin Mehta, Troy, MI (US)

(73) Assignee: Inergy Automotive Systems Research (S.A), Brussels (BE)

( * ) Notice: Subject to any disclaimer, the term of this patent is extended or adjusted under 35 U.S.C. 154(b) by 0 days.

(21) Appl. No.: 12/162,207

(22) PCT Filed: Jan. 26, 2007

(86) PCT No.: PCT/EP2007/050768

§ 371 (c)(1),
(2), (4) Date: Oct. 9, 2008

(87) PCT Pub. No.: WO2007/088137

PCT Pub. Date: Aug. 9, 2007

(65) Prior Publication Data

US 2009/0078239 A1    Mar. 26, 2009

Related U.S. Application Data

(60) Provisional application No. 60/763,390, filed on Jan. 31, 2006.

(30) Foreign Application Priority Data

Mar. 3, 2006   (EP)   .................................. 06110657

(51) Int. Cl.
*F02M 33/02*   (2006.01)

(52) U.S. Cl. ...................... 123/521; 123/518; 123/519; 123/520

(58) Field of Classification Search ................. 123/516, 123/518–521; 137/215–218
See application file for complete search history.

(56) References Cited

U.S. PATENT DOCUMENTS 4,887,578 A    12/1989   Woodcock et al.

(Continued)

FOREIGN PATENT DOCUMENTS

DE    102004005933    11/2004

(Continued)

OTHER PUBLICATIONS

PCT Search Report dated Apr. 25, 2007 for International Application PCT/EP2007/050768 (2 p.).

(Continued)

*Primary Examiner*—Erick Solis
*Assistant Examiner*—David Hamaoui
(74) *Attorney, Agent, or Firm*—Oblon, Spivak, McClelland, Maier & Neustadt, L.L.P.

(57) ABSTRACT

A method for recovering vapor during an onboard refueling operation comprising the steps of:
 providing a flow path between a fuel tank and a purge canister;
 providing a valve in the flow path;
 providing a fuel level sensor for indicating the level of fuel in the fuel tank, and a vapor pressure sensor for indicating the pressure of the fuel vapor in the fuel tank; and
 actuating the valve to selectively open and close the flow path in response to signals received from the fuel level sensor and the vapor pressure sensor.

7 Claims, 2 Drawing Sheets

U.S. PATENT DOCUMENTS

| | | | |
|---|---|---|---|
| 5,476,083 A * | 12/1995 | Blumenstock | 123/520 |
| 5,647,334 A | 7/1997 | Miller | |
| 6,167,920 B1 | 1/2001 | Enge | |
| 6,253,802 B1 | 7/2001 | Enge | |
| 6,443,190 B1 | 9/2002 | Enge | |
| 6,463,965 B1 * | 10/2002 | Rasche et al. | 141/65 |
| 6,508,107 B2 * | 1/2003 | Carrell et al. | 73/54.02 |
| 6,516,835 B2 | 2/2003 | Enge | |
| 6,601,617 B2 | 8/2003 | Enge | |
| 6,986,341 B2 * | 1/2006 | Mitani et al. | 123/520 |
| 7,077,112 B2 | 7/2006 | Mitani et al. | |
| 2003/0172720 A1 * | 9/2003 | Sweetland et al. | 73/49.7 |
| 2005/0279406 A1 * | 12/2005 | Atwood et al. | 137/39 |
| 2007/0272219 A1 | 11/2007 | Hill | |
| 2008/0047532 A1 | 2/2008 | Hill | |
| 2009/0056680 A1 | 3/2009 | Hill et al. | |
| 2009/0063027 A1 | 3/2009 | Grant et al. | |
| 2009/0099795 A1 | 4/2009 | Behar et al. | |

FOREIGN PATENT DOCUMENTS

| | | |
|---|---|---|
| GB | 2388646 | 11/2003 |
| WO | WO2005059349 | 6/2005 |
| WO | WO2006045839 A1 | 5/2006 |
| WO | WO2006072633 | 7/2006 |
| WO | WO2007023142 A1 | 3/2007 |
| WO | WO2007090802 A1 | 8/2007 |
| WO | WO2008049819 A1 | 5/2008 |

OTHER PUBLICATIONS

PCT International Preliminary Report on Patentability dated Aug. 5, 2008 by the International Bureau of WIPO including the Written Opinion provided by EPO for International Patent Application No. PCT/EP2007/050768 (6 p.).

U.S. Appl. No. 11/718,140, filed Apr. 27, 2007, Hill et al.
U.S. Appl. No. 12/064,333, filed Jun. 23, 2008, Hill et al.
U.S. Appl. No. 12/162,439, filed Dec. 1, 2008, Behar et al.
U.S. Appl. No. 60/854,098, filed Oct. 25, 2006, Slusser et al.

* cited by examiner

METHOD FOR RECOVERING VAPOR DURING AN ONBOARD REFUELING OPERATION

CROSS-REFERENCE TO RELATED APPLICATIONS

This application is a U.S. national stage application under 35 U.S.C. §371 of International Application No. PCT/EP2007/050768, filed Jan. 26, 2007, which claims priority to U.S. Application No. 60/763,390, filed on Jan. 31, 2006, and which further claims priority to European Application EP06110657.1, filed Mar. 3, 2006, all of these applications being herein incorporated by reference in their entirety for all purposes.

BACKGROUND OF THE INVENTION

The present invention relates to a method for recovering fuel vapor during an onboard refueling operation, more particularly, a method for operating an onboard refueling vapor recovery (ORVR) system of an automotive vehicle.

Increasingly stringent environmental standards have resulted in regulations necessitating a significant reduction in fuel vapors escaping from a vehicle fuel tank during refueling. These regulations generally strive to essentially eliminate fuel vapor escaping into the atmosphere during refueling. The resultant emission control systems are referred to as onboard refueling vapor recovery (ORVR) systems.

In such an ORVR system, the filler neck of the fuel system is designed to a diameter to create a seal in the filler neck to prevent vapors from escaping from the fuel tank through the filler neck. During refueling, the fuel volume within the tank increases, thereby reducing the available space for fuel vapors. The pressure created by filling the tank causes the fuel vapors to exit through an exhaust port to a purge canister. The purge canister typically includes a charcoal element to capture hydrocarbons while releasing filtered vapors into the atmosphere.

In a typical ORVR system, a control valve is placed in the flow path between the fuel tank and the purge canister. The primary purpose of such a control valve is to enable the transmission of vapor while preventing the transmission of liquid fuel to the purge canister. In case of liquid fuel reaching the purge canister, a situation referred to as carryover, fuel can collect within the purge canister. Because the canister may later be purged to provide fuel to the vehicle via the intake manifold, excessive fuel carryover may cause liquid fuel to exit the fuel system or interfere with engine operation.

Typically ORVR control valves are of mechanical nature. They are normally open and thus provide a flow path between the fuel tank and the purge canister. However, these normally open valves must be adaptable to close off the flow path between the fuel tank and the purge canister during conditions such as vibration, slosh, and vehicle tilting which might otherwise result in a carryover condition. Typical valves include a buoyant member with a bias toward an open position. The valve is responsive to slosh, vibration, and tilting conditions to close the vapor passage. However, such valves are often slow to respond and include many moving parts which eventually deteriorate, thereby adversely affecting operation of the valve.

U.S. Pat. No. 6,601,617 to Enge proposes to provide the ORVR system with an electronic control valve to selectively enable the passage of fuel vapor from the fuel tank to the purge canister during predetermined conditions. Furthermore, a method is proposed for controlling the electronic control valve which enables vapor to pass from the fuel tank to the purge canister only during predetermined conditions.

This invention is also directed to a method for recovering vapor during an onboard refueling operation in a vehicle. The method includes providing a flow path between a fuel tank and a purge canister. The method also includes providing a fueling event sensor for detecting at least one of the introduction of fuel into the fuel tank or the introduction of a filler nozzle into a filler neck of the fuel tank, defined as a fueling event. The method further includes providing an ORVR valve in the flow path and actuating the ORVR valve in accordance with the output of the fueling event sensor to selectively open and close the flow path.

A problem associated with electronic ORVR valves controlling the shutoff level, and indeed of the method as disclosed in U.S. Pat. No. 6,601,617, is a fuel spit-back. The closing of all communication to the purge canister at the end of a refueling event will in many cases result in liquid fuel being ejected out of the fill head and, in some cases, onto the operator. It is clear that this is both a safety and an environmental concern and must be avoided.

It is therefore an object of the present invention to provide an improved method for recovering fuel vapor during an onboard refueling operation wherein spit-back is prevented.

SUMMARY OF THE INVENTION

The present invention provides a method for recovering vapor during an onboard refueling operation comprising the steps of
  providing a flow path between a fuel tank and a purge canister;
  providing a valve in said flow path;
  providing a fuel level sensor for indicating the level of fuel in the fuel tank, and a vapor pressure sensor for indicating the pressure of the fuel vapor in the fuel tank; and
  actuating the valve to selectively open and close the flow path in response to signals received from the fuel level sensor and the vapor pressure sensor.

With such a method, the valve can be controlled so as to avoid spit-back. It is in fact a merit of the present invention to have realized that the spit-back occurs if the flow path between the fuel tank and the purge canister is closed for an extended period of time. By more precisely controlling the opening and closing of the flow path, the spit-back effect can be avoided.

In the method of the invention, the valve is preferably an electronic valve. This valve is also preferably a solenoid valve and even more preferably, a solenoid valve according to patent applications WO 2005/059349 and PCT/EP2006/050085 both in the name of INERGY, the content of which is incorporated by reference in the present case.

In the method of the invention, the valve is preferably also actuated by a refueling event indicator and even more preferably, it is an electronic valve being actuated that way.

The refueling event indicator preferably comprises a device chosen from the group comprising a fill door sensor, a fill pipe sensor, a fill neck check valve sensor, an ignition sensor, a gear shift sensor, a speed sensor, a full level sensor, and any combination thereof. Alternatively, the fuel level sensor can be used as to detect a refueling event.

More particularly, the method according to the invention preferably actuates the electronic valve to open the flow path when a start of a refueling event is detected and actuates the electronic valve to close the flow path when the level value received from the fuel level sensor has reached a predetermined fuel level. Upon closure of the flow path, the pressure value received from a vapor pressure sensor associated with the fuel tank is preferably monitored and, depending on the pressure value, the electronic valve is actuated to open and close the flow path.

The opening and closing of the flow path, after an end of refueling event has been detected, can comprise the steps of measuring and storing a pressure value; determining a peak pressure value by comparing the measured pressure value to a previously stored pressure value; storing the peak pressure value; monitoring the pressure value until the pressure value has decayed to a predetermined percentage of the peak pressure value; actuating the electronic valve to open the flow path for a predetermined length of time, then actuating the electronic valve to close the flow path.

The shutting off of the fuel nozzle occurs shortly after the pressure in the tank peaks and begins to decay. The reason for the decay is that, if the flow path is closed, at certain point, some fuel vapor will escape the fuel tank through the fuel fill neck. Once the venting begins, the vapor begins exiting out the fuel fill neck at a rapid rate, causing decay in tank pressure. If too much flow is allowed out the fuel fill neck, the vehicle fails emissions requirements and in some cases spit-back. By venting the tank to the canister at this point the risk of spit-back is mitigated.

The percentage of the peak pressure value, after which the flow path is opened can e.g. be between 50 and 99%. The predetermined length of time at which the flow part remains open can e.g. range from 1 millisecond to 2 seconds. It should however be understood that these values may vary depending on a number of factors such as e.g. vehicle characteristics or climate characteristics.

Once the flow path is again closed, the method can further comprise the steps of monitoring the pressure value and determine whether the pressure value is increasing. If the pressure value is increasing, the above steps of detecting the peak pressure value and the decay of the pressure value can be repeated. If, on the other hand, the pressure value is not increasing, it can be concluded that the refueling event is definitely finished and the cycle can be ended.

An electronic control unit is preferably provided for receiving signals from the refueling event indicator, the fuel level sensor, and the vapor pressure sensor. The electronic control unit evaluates the received signals and sends a signal to the electronic valve to open and close the flow path accordingly. The electronic control unit of this embodiment may be a stand alone microprocessor, allowing the system to be added to any vehicle with a DC voltage source. Conversely, it can be any processor already on the vehicle, to save cost. This processor could among others be the vehicle's Engine Control Unit (ECU), or a processor controlling the fuel system functions such as fuel pump speed control . . . (FSCU or Fuel System Control Unit).

BRIEF DESCRIPTION OF THE DRAWINGS

The drawings form an integral part of the specification and are to be read in conjunction therewith. The detailed description of the invention is a non-limiting description of one preferred embodiment of the invention.

DETAILED DESCRIPTION OF THE INVENTION

Figure 1:
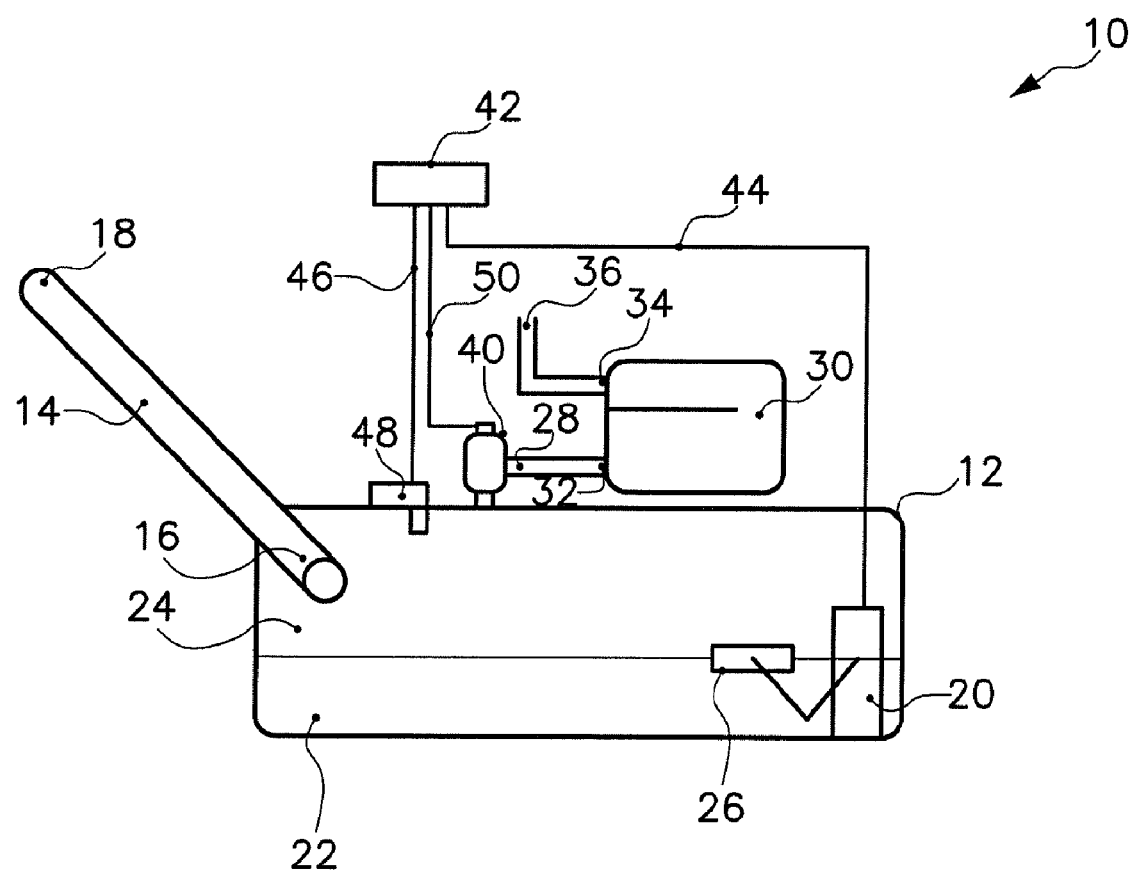
FIG. 1: is a block diagram of an onboard refueling vapor recovery (ORVR) system arranged in accordance with the principles of the present invention.

Referring to FIG. 1, an onboard refueling vapor recovery system is indicated generally at 10 and comprises a fuel tank 12 for storing liquid fuel therein. A fuel fill neck 14 is provided with its lower end 16 connected through the wall of the fuel tank 12 and with its upper end 18 being arranged so as to receive a refueling nozzle. A fuel level sensor 20 is arranged in the fuel tank 12 for determining the level of fuel therein. The space occupied by liquid fuel is generally indicated at 22, whereas the remaining space of the tank, i.e. the space containing fuel vapor, is generally indicated at 24. The fuel level sensor 20 comprises a floater device 26 swimming on the upper surface of the liquid fuel. The level of liquid fuel in the fuel tank 12 is determined by the vertical position of the floater device 26.

As liquid fuel is poured into the fuel tank 12 though the fuel fill neck 14, the liquid fuel space 22 increases whereas the fuel vapor space 24 decreases. Excess fuel vapor exits the fuel tank 12 via a flow path 28 and enters a purge canister 30 through an inlet port 32. Such a purge canister 30 comprises a charcoal element that is used to store the excess fuel vapor from the fuel tank 12. During operation of the engine, the fuel vapor stored in the purge canister 30 is drawn there from via a purge port 34 and taken to the engine via a purge path 36 for burning.

An electronic valve 40 is arranged in the flow path 28 between the fuel tank 12 and the purge canister 30 for opening and closing the flow path 28 as appropriate. Indeed, the flow path 28 should be open during the refueling event so as to allow excess fuel vapor to escape to the purge canister 30. The flow path 28 should however be closed during operation of the vehicle to avoid liquid fuel from reaching the purge canister 30. The electronic valve 40 is a solenoid controlled shutoff valve, which is controlled by a signal received from an electronic control unit (ECU) 42.

The ECU 42 evaluates the need for the flow path 28 to be open or closed and controls the electronic valve 40 accordingly. Via a first line 44, the ECU 42 receives a signal indicative of the level of liquid fuel in the fuel tank, as determined by the fuel level sensor 20. Via a second line 46, the ECU 42 receives a signal indicative of the pressure in the fuel vapor space 24 of the fuel tank 12.

The pressure in the fuel vapor space 24 is determined by a pressure sensor 48 mounted in the wall of the fuel tank 12 and in communication with the fuel vapor space 24. The pressure sensor 48 is preferably a low pressure sensor.

Based on the signals received from the fuel level sensor 20 and the pressure sensor 48, the ECU 42 sends a control signal via a third line 50 to the electronic valve 40 to open or close the flow path 28.

Figure 2:
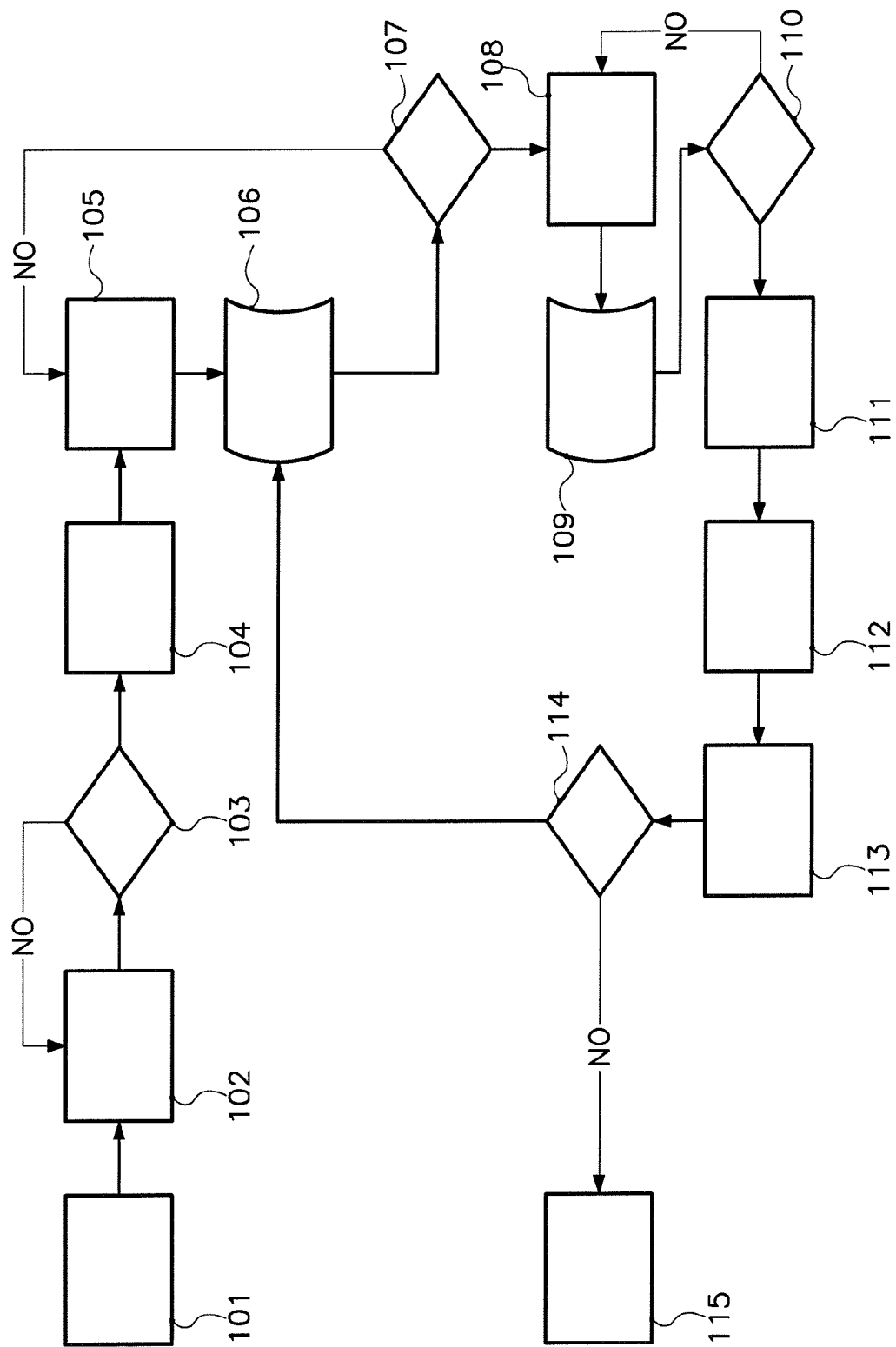
FIG. 2: is a flow chart of the method for recovering fuel vapor during an onboard refueling operation according to a preferred embodiment of the present invention.

The control algorithm used by the ECU 42 follows the method as described herein, a preferred embodiment of which is explained by referring to FIG. 2.

FIG. 2 shows a flow chart of the method for recovering fuel vapor during an onboard refueling operation. The method commences at the start of the refueling process, which can be detected by the introduction of a refueling nozzle in the upper end of the fuel fill neck, a flow of fuel in the fuel fill neck or an increase in the liquid fuel level in the fuel tank. Alternatively, other means can be used to detect the start of a refueling process.

When the start of a refueling process is detected, the electronic valve is controlled to open 101 the tank to canister communication, i.e. to open the flow path. Excess fuel vapor from the fuel tank can escape from the fuel tank to the purge canister and be stored in the charcoal element thereof.

The ECU now monitors 102 the fuel level in the fuel tank by means of the signal received from the fuel level sensor. It is checked 103 if the detected fuel level has reached a predetermined level and, in the affirmative, the tank to canister communication is closed 104.

The ECU now monitors 105 the pressure in the fuel vapor space by means of the signal received from the pressure sensor. The determined pressure is stored 106. It is checked 107 if the pressure has peaked by comparing the pressure to the previously stored pressure.

If it is determined that the pressure has peaked, the pressure is again monitored 108 and stored 109. It is then checked 110 if the pressure has decayed to a predetermined percentage of the peak pressure. If the pressure has sufficiently decayed, the tank to canister communication is opened 111 and a timer is started 112.

Once the timer has reached a certain value, the timer is again stopped and the tank to canister communication is closed 113. The pressure in the fuel vapor space is again monitored and it is checked 114 if the pressure is rising.

If the pressure is rising, the pressure is again stored at 106 and the pressure peak and decay checks are carried out again before the flow path is again opened for a predetermined period of time. If, on the other hand, the pressure is no longer rising, the end of the refueling process is concluded and the cycle is ended 115.

Such a method controls the electronic valve between the fuel tank and the purge canister in such a way that pressure build-up in the fuel tank and fuel spit-back are avoided.

While a specific embodiment has been shown and described in detail to illustrate the principles of the present invention, it will be understood that the invention may be embodied otherwise without departing from such principles. For example, one skilled in the art will readily recognize from the above discussion and from the accompanying drawings and claims that various changes, modifications and variations can be made without departing from the spirit and scope of the invention as described in the following claims.

The invention claimed is:

1. A method for recovering vapor during an onboard refueling operation, comprising the steps of:
   providing a flow path between a fuel tank and a purge canister;
   providing a fuel level sensor that indicates a level of fuel in the fuel tank, a vapor pressure sensor that indicates a pressure of fuel vapor in the fuel tank, and a refueling event indicator;
   providing an electronic valve in said flow path, which is actuated in response to signals received from the fuel level sensor, the vapor pressure sensor, and the refueling event indicator;
   actuating the electronic valve to open the flow path when a start of a refueling event is detected;
   monitoring a level value received from the fuel level sensor when the flow path is open;
   actuating the electronic valve to close the flow path when the level value reaches a predetermined fuel level;
   monitoring a pressure value received from the vapor pressure sensor when the flow path is closed; and
   actuating the electronic valve to cyclically open and close the flow path depending on the pressure value until a determination is made that the refueling event is finished on the basis of the monitored pressure value,
   wherein said actuating of the electronic valve to open and close the flow path depending on the pressure value comprises the steps of:
      measuring and storing a pressure value received from the vapor pressure sensor;
      determining a peak pressure value by comparing the measured pressure value to a previously stored pressure value;
      storing the peak pressure value;
      monitoring the pressure value received from the vapor pressure sensor until the pressure value decays to a predetermined percentage of the peak pressure value; and
      actuating the electronic valve to open the flow path for a predetermined length of time if and when the pressure value decays to a predetermined percentage of the peak pressure value, then actuating the electronic valve to close the flow path.

2. The method of claim 1, wherein said determination is made through the steps of:
   monitoring the pressure value and determining whether the pressure value is increasing;
   when the pressure value is not increasing, concluding that the refueling event is finished and ending the cycle.

3. The method of claim 1, wherein the predetermined percentage of the peak pressure value, after which the electronic valve is actuated to open the flow path, is between 50 and 99%.

4. The method of claim 1, wherein the predetermined length of time is between 0.001 and 2 seconds.

5. The method according to claim 1, wherein an electronic control unit is provided for receiving signals from the refueling event indicator, the fuel level sensor, and the vapor pressure sensor, and wherein the electronic control unit evaluates the received signals and sends a signal to the electronic valve to open and close the flow path accordingly.

6. The method according to claim 1, wherein the refueling event indicator comprises a device selected from the group consisting of a fill door sensor, a fill pipe sensor, a fill neck check valve sensor, an ignition sensor, a gear shift sensor, a speed sensor, a full level sensor, and any combination thereof.

7. The method according to claim 1, wherein the valve is a solenoid valve.

* * * * *